United States Patent [19]

Niino et al.

[11] Patent Number: 4,582,678
[45] Date of Patent: Apr. 15, 1986

[54] METHOD OF PRODUCING ROCKET COMBUSTORS

[75] Inventors: Masayuki Niino, Sendai; Akio Suzuki; Nobuyuki Yatsuyanagi, both of Shibata; Akinaga Kumakawa, Souma; Masaki Sasaki; Hiroshi Tamura, both of Shibata; Fumiei Ono, Watari; Yoshimichi Masuda, No. 110, 1 Midorigahama 9-chome, Chigasaki-shi, Kanagawa-ken; Ryuzo Watanabe, 15-12 Dainohara 3-chome, Sendai-shi, Miyagi-ken; Junjiro Takekawa, 25-1 Yumino-machi, Sendai-shi, Miyagi-ken; Yoshihiko Doi, Itami; Nobuhito Kuroishi, Itami; Yoshinobu Takeda, Itami; Shigeki Ochi, Itami, all of Japan

[73] Assignees: National Aerospace Laboratories of Science & Technology Agency; Yoshimichi Masuda; Ryuzo Watanabe; Junjiro Takekawa; Sumitoro Electric Industries, Ltd., all of Japan

[21] Appl. No.: 653,011

[22] Filed: Sep. 21, 1984

[30] Foreign Application Priority Data

Oct. 7, 1983 [JP] Japan .............................. 58-188804

[51] Int. Cl.$^4$ .............................................. B22F 7/00
[52] U.S. Cl. ................................... 419/8; 419/26; 419/27; 419/28; 419/38; 419/42; 419/49; 419/68; 29/157 C; 29/423; 428/548; 428/552; 428/565; 428/398; 428/403; 428/689; 428/697; 428/699; 427/405
[58] Field of Search ............ 419/5, 7, 8, 12, 14, 419/17, 15, 18, 19, 23, 31, 32, 28, 29, 47, 24, 2, 68, 49, 42, 26, 27, 38; 29/157 C, 423; 427/405; 428/548, 552, 565, 398, 403, 689, 697, 699

[56] References Cited

U.S. PATENT DOCUMENTS 2,363,337 11/1944 Kelly .................................. 419/9
4,508,680 4/1985 Niino et al. ......................... 419/8

Primary Examiner—Stephen J. Lechert, Jr.
Attorney, Agent, or Firm—Lowe Price LeBlanc Becker & Shur

[57] ABSTRACT

A method of producing rocket combustors wherein in forming an outer cylinder by a powder metallurgical method on the outer side of a cylinder provided on its outer periphery with a cooling wall of channel construction having a plurality of grooves (14), an Ni electroforming layer is formed on the outer side of the outer cylinder, and also a method of producing rocket combustors wherein an outer cylinder is of multilayer construction having two or more layers.

17 Claims, 12 Drawing Figures

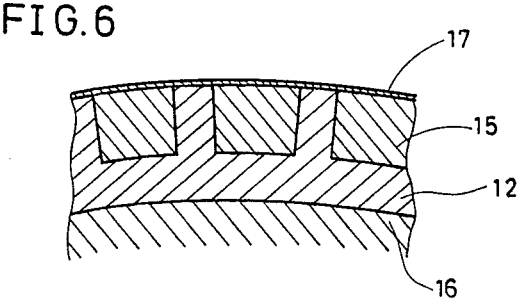
FIG.6
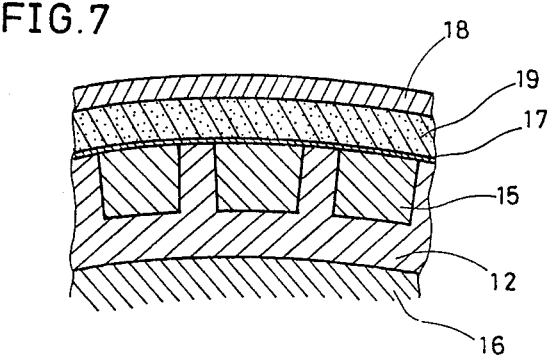
FIG.7
FIG.8
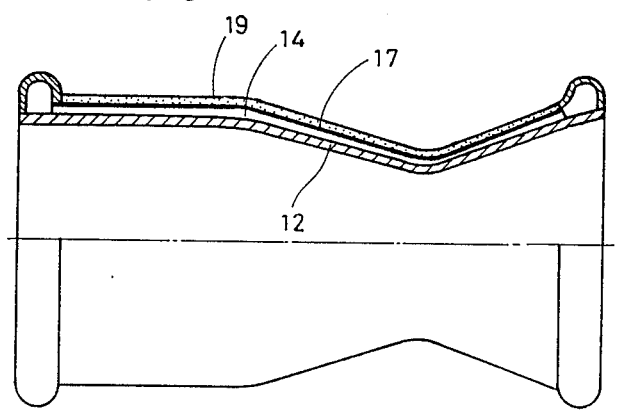
FIG.9
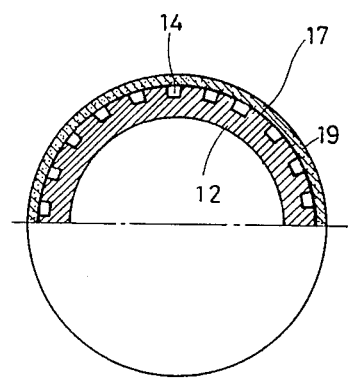

METHOD OF PRODUCING ROCKET COMBUSTORS

BACKGROUND OF THE INVENTION

1. Field of the Invention

This invention relates to a method of producing combustion chambers for liquid propellant rocket engines and particularly it relates to a method of producing combustion chambers of the type having a channel construction for cooling purposes.

2. Description of the Prior Art

In recent years, in liquid propellant rocket engines, there has been a demand for higher thrust, with the result that the cooling and pressure resistance of the combustion chamber have become important problems. In a conventional liquid propellant rocket engines, the combustion chamber is provided with a cooling wall of channel construction to satisfy these cooling and pressure resistance requirements. FIGS. 1 and 2 are a schematic perspective view and a cross section, respectively, of a conventional rocket engine chamber. As is clear from FIG. 2, the combustion chamber 1 comprises an inner cylinder 2 made of a high-thermal conductivity material, such as copper or a copper alloy, and an outer cylinder 3 joined to said inner cylinder 2. The periphery of the inner cylinder 2, as is clear from FIG. 2, is formed with a plurality of grooves 4, which constitutes a cooling section of channel construction; liquid hydrogen, for example, is passed through these grooves 4 to cool the combustion chamber 1.

In this connection, the combustor 1 described above has heretofore been produced, as shown in FIGS. 3 through 5 depicting fragmentary perspective views, by preparing the inner cylinder 2, machining the outer periphery of the inner cylinder 2 to form the grooves 4, and joining the outer cylinder 3 to the periphery of the inner cylinder 2. However, since the rocket combustor 1 will be subjected to very high pressures, the inner and outer cylinders 2 and 3 must be joined together very strongly.

Thus, for joining the inner and outer cylinders 2 and 3 together, there have heretofore been tried various methods such as brazing, electroforming, powder metallurgy, and diffusion bonding. However, in brazing, if the fluidity of the brazing material is poor, there has been a disadvantage that uniform joining strength cannot be obtained. Further, in the case of electroforming, since it is used to form an outer cylinder by Ni-electroplating, there has been a problem that the electrolysis reaction takes a long time. Further, when the diffusion bonding method is used, the bonding accuracy obtained has been found to be poor.

On the other hand, U.S. patent application Ser. No. 686,618 and U.S. Pat. No. 4,508,680 disclose methods of joining inner and outer cylinders by powder metallurgy. According to these prior arts, the production method comprises preparing an inner cylinder provided at its outer periphery with a cooling wall of channel construction having a plurality of grooves, filling the grooves of the inner cylinder with paraffin wax or a mixture of paraffin wax and $Al_2O_3$ powder, and compression molding a metal powder placed around the periphery of the inner cylinder filled with said filler, under isostatic pressure to a predetermined thickness to thereby form an outer cylinder.

If it is produced by this method, it is necessary to form a gas-impermeable truly dense sintered layer to prevent leakage of the cooling agent. Thus, a copper powder compacted layer having a high molding density must be produced under high pressure and the copper layer thickness must be increased, leading to a drawback that the production method and conditions are severe.

SUMMARY OF THE INVENTION

A principal object of this invention is to provide a method of producing rocket combustors wherein an outer cylinder is powder-metallurgically formed around the periphery of an inner cylinder, said method being characterized in that said drawback is eliminated and the joining strength of the inner and outer cylinders is high, said outer cylinder being formed by isostatic pressing at a relatively low pressure to have a dense and rugged structure.

In an aspect of this invention, there is provided a method of producing rocket combustors comprising the steps of preparing an inner cylinder provided on its outer periphery with a cooling section of channel construction having a plurality of grooves, filling the grooves of said inner cylinder with a filler, compression molding a metal powder to a predetermined thickness to form an outer cylinder, sintering the same, and forming an Ni electroforming layer on the outer side thereof. Forming an Ni electroforming layer on the outer side makes it possible to produce a rocket combustor having an outer layer of high strength.

Further, subsequently to the step of filling the grooves with a filler, a Cu plating shell may be formed on the outer periphery of the inner cylinder filled with the filler. This formation of a Cu plating shell greatly reduces the frictional loss due to the passage of the cooling medium through the cooling section of channel construction.

In addition, in the compression molding step, copper powder, for example, may be used as the metal powder. However, the joining strength of the inner and outer cylinders can be increased by replacing copper powder by copper powder which has Ag or Sn powder incorporated therein or which is plated with Ag or Sn.

Similarly, to increase the joining strength, the filling step may be followed by the step of applying Ag or Sn plating to the outer periphery of the inner cylinder filled with the filler.

Further, said step of forming a Cu plating shell may be followed by the step of applying Ag or Sn plating to the outer periphery of the Cu plating layer. This makes it possible to further reduce the frictional loss and to effectively increase the joining strength of the outer and inner cylinders.

In another aspect of this invention, there is provided a method of producing rocket combustors comprising the step of preparing an inner cylinder provided on its outer periphery with a cooling wall of channel construction having a plurality of grooves, filling the grooves of the inner cylinder with a filler, compression molding around the periphery of the inner cylinder filled with said filler a base layer of Cu powder alone or Cu powder mixed with Ag and Sn powders and a second layer of a mixture of Cu powder and Ni-base superalloy powder, applying a sintering treatment after said compression molding, and applying a hot isostatic pressing treatment subsequently to said sintering step. In this case also, since the compression molded layer forming the outer cylinder is of said two-layer construction, the density and strength of the outer cylinder can be increased. Further, a third layer may be formed on the outer side of the second layer of said mixture of copper powder and Ni-base superalloy powder. In this case, the provision of the third layer further increases the density and strength of the outer cylinder.

In addition, said compression molded layer of two-layer or three-layer construction may be made either separately for each layer or in such a manner that the different metal powders are filled into the mold in advance to form two or three layers and then compression molded at a time.

In the case of forming said compression molded layer of two- or three-layer construction, too, a Cu plating shell may be formed around the periphery of the inner cylinder, as described above, whereby the frictional loss due to the passage of the cooling medium can be greatly reduced. Similarly, the Ag or Sn plating step may be applied to the outer periphery of the inner cylinder. Thereby, the joining strength of the outer and inner cylinders can be further increased.

As for the filler for the inner cylinder, in addition to low-melting alloys such as Woods metal, it is possible to use a filler which is composed of ceramic powder or an organic compound such as potassium phosphate and which withstands the temperature required for hot isostatic pressing.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 3 through 5 are fragmentary perspective views illustrating the conventional steps of production of the rocket combustor shown in FIGS. 1 and 2, wherein FIG. 3 shows an inner cylinder, FIG. 4 shows said inner cylinder now formed on its outer periphery with a cooling section of channel construction, and FIG. 5 shows said inner cylinder now having an outer cylinder joined thereto;

FIGS 6 and 7 are fragmentary sectional views illustrating the steps of implementing a first embodiment of the invention, wherein FIG. 6 shows the formation of a Cu plating layer subsequent to the filling step, and FIG. 7 shows the joining of an outer cylinder;

FIGS. 8 and 9 are view showing a rocket combustor produced through the steps shown in FIGS. 6 and 7, wherein FIG. 8 is a longitudinal half-sectional view and FIG. 9 is a cross-sectional view;

DESCRIPTION OF THE PREFERRED EMBODIMENTS

Figure 1:
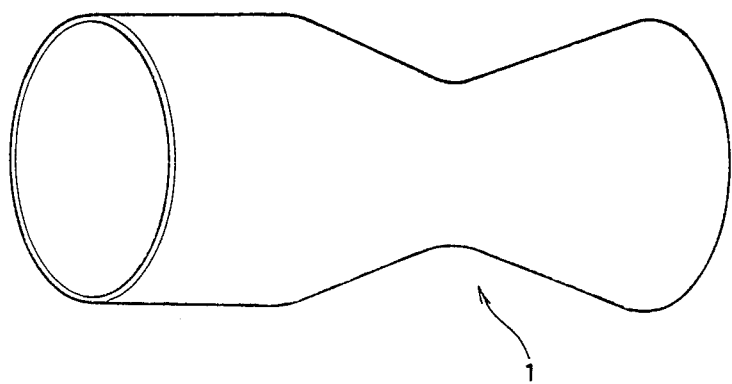
FIG. 1 is a schematic perspective view showing an example of a conventional rocket combustor.
Figure 2:
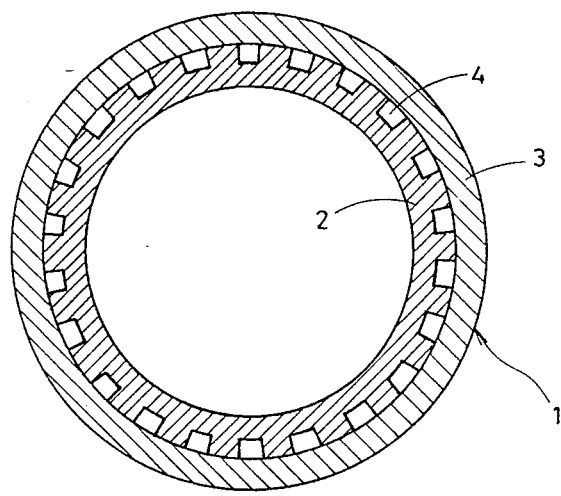
FIG. 2 is a cross-sectional view of the rocket combustor shown in FIG. 1.
Figure 3:
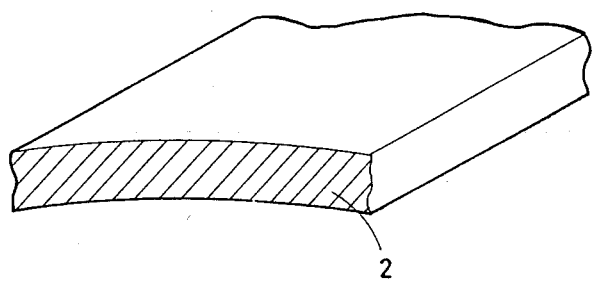
Figure 4:
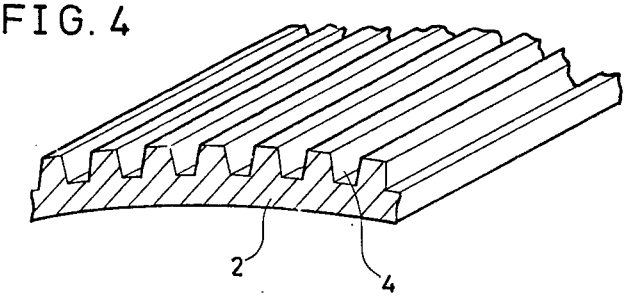
Figure 5:
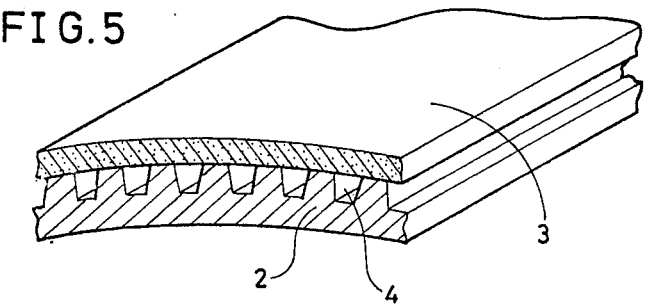

First, an inner cylinder of oxygen-free copper formed on its outer peripheral surface with a cooling section of channel construction having a plurality of grooves is prepared by machining. The inner cylinder is then immersed completely in molten Woods metal or the latter is poured into a mold having said inner cylinder placed therein, whereby the periphery and inner side of the inner cylinder are filled with Woods metal. In addition, in order to remove the casting defects such as shrinkage cavities and air bubbles or to improve the run, the inner cylinder may be subjected to gas pressing using a pressure of up to 8 kgf/cm$^2$ after casting, in which contraction and deformation of Woods metal during isostatic pressing can be effectively prevented. When the Woods metal, or the filler, has been solidified, the peripheral excess Woods metal is removed by machining. It is to be noted that when Woods metal is to be poured, a metal core such as of iron or stainless steel may be inserted in the inner side, i.e., hollow portion of the inner cylinder to thereby reduce the required amount of Woods metal to be poured. Alternatively, a metal core of the same shape as the hollow portion of the inner cylinder may be inserted in the inner side of the inner cylinder.

In addition, Woods metal serving as a low-melting alloy used as the filler can be prepared to have a melting start temperature of about 50°–200° C. by suitably adjusting the proportions of its components. The removal of Woods metal is effected by heating it to temperatures in the range of 100°–250° C. However, it is necessary to select an optimum grade of Woods metal by taking into account its hardness and wettability with respect to the copper on the surface of the grooves forming the cooling section of channel construction formed around the periphery of the inner cylinder. While the removal and sintering of Woods metal may be performed continuously in the same oven, it is preferable to perform them separately since Woods metal consists mainly of a low-melting alloy and has a relatively high vapor pressure.

As shown in FIG. 6, the inner cylinder 12 having Woods metal 15 filled into its grooves on the outer periphery and Woods metal 16 filled into its inner hollow portion is formed on its outer periphery with a Cu plating shell 17. As will be later described, in the case of a method using a metal powder as a material for forming the outer cylinder by powder metallurgy, depending upon the cooling condition of the rocket combustor, the particle diameter of the metal powder becomes greater than the thickness of the velocity boundary layer of the cooling medium, leading to a very great frictional loss when the cooling medium is passed. In this embodiment, in order to avoid such frictional loss, the Cu plating shell 17 is formed on the outer periphery of the inner cylinder 12 after the latter has been filled with Woods metal.

The outer surface of the Cu plating shell 17 is subjected to a surface cleaning treatment using sandpaper or an acid, whereby it is formed with a clean and activated surface. This surface treatment is effected to increase the strength of joining to the outer cylinder by sintering to be subsequently effected. In this surface treatment, it is also possible to increase the joining strength after sintering by applying Ag or Sn plating.

The inner cylinder 12 formed on its outer periphery with the Cu plating shell 17 is then placed in a cylindrical mold 18, as shown in FIG. 7, and copper powder is filled in a space between the mold 18 and the Cu plating layer 17. The copper powder to be used is preferably electrolytic copper powder of −250 mesh superior to compactability and compressibility. If the filling is effected while vibrating the mold 18 or applying a degassing treatment for removing the air from inside the mold 18 by a vacuum device, then filling density can be made higher and uniform and hence the strength and other characteristics after molding and sintering can be improved and the variation of the characteristics reduced.

The powder filler layer 10 (see FIG. 7) is then compression molded by isostatic pressing. The molding pressure is preferably 1 ton/cm$^2$ or above. The molding density varies with the filling method, degassing treatment, and particle size, but it is desirable that the CIP molding density of the CIP compact be above about 70% of the theoretical density. If it is below this figure, the sintering condition for obtaining densities above 90% of the theoretical density becomes limited.

To remove the Woods metal filler from the green compact, the latter is heated to a temperature of 100°–250° C. to melt the Woods metal masses 15 and 16 and the latter are removed from the grooves 14 and inner side of the inner cylinder 12. In this case, it is important that this operation be performed in an atmosphere which does not oxidize the copper in the inner cylinder and in the molded layer 19 forming the outer cylinder, e.g., in an H$_2$ gas atmosphere, in a vacuum, or in an Ar gas atmosphere. Subsequently, a sintering treatment is applied. As for the sintering conditions, generally, the sintering temperature is 850°–950° C., the sintering time is 30 minutes to 2 hours, and the atmosphere is a vacuum, Ar gas, or H$_2$ gas. The construction of the rocket combustor thus obtained is shown in FIGS. 8 and 9.

Figure 10:
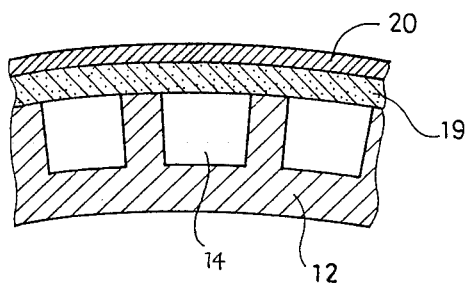
FIG. 10 is a fragmentary cross-sectional view showing the construction of a rocket combustor obtained by a first embodiment of the invention.

Upon completion of said sintering, the outer side is plated with Ni by Ni electroforming to increase the strength of the outer cylinder 19. In this case, the Ni plating is followed by the final machining to finish the outer cylinder to the predetermined size to complete the outer cylinder 19. The construction of the rocket combustor thus obtained is shown in a fragmentary sectional view in FIG. 10. As is clear from FIG. 10, an Ni layer 20 is formed on the outer side of the outer cylinder 19 made of copper powder.

In the embodiments described so far, the compression molding layer 19 forming the outer cylinder has been formed by a single compression molding step, but the invention is not limited thereto. Thus, as will be presently described, the compression molding may be performed by two or more compression molding steps.

Figure 11:
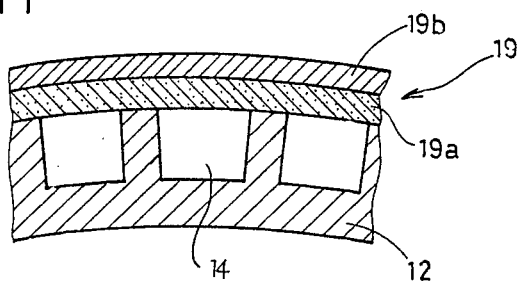
FIG. 11 is a fragmentary cross-sectional view showing the construction of a rocket combustor obtained by a second embodiment of the invention.

FIG. 11 is a fragmentary cross-sectional view showing the construction of a rocket combustor obtained by a second embodiment of the invention. In this case, the compression molding layer 19 comprises a first compression molding layer 19a and a second compression molding layer 19b. In the method of producing rocket combustors according to this embodiment, on the outer periphery of the inner cylinder 12 filled with Woods metal, not shown, copper powder is compression molded to form the first compression molding layer 19a, on whose outer side the second compression layer 19b is formed using a mixture of Ni-base superalloy powder and copper powder. Since the compression molding layer 19 forming the outer cylinder is formed by the two-stage compression molding step in this manner and since Ni-base superalloy powder is incorporated in the outer side, the strength of the outer cylinder can be effectively increased.

Figure 12:
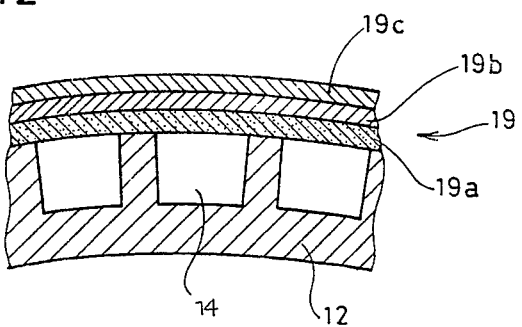
FIG. 12 is a fragmentary cross-sectional view showing the construction of a rocket combustor obtained by a third embodiment of the invention.

As shown in FIG. 12, the compression molding layer 10 may be formed by a three-stage step. In this case, similarly to the construction shown in FIG. 11, a first compression molding layer 19a is formed using copper powder, then a second compression molding layer 19b using copper powder mixed with Ni-base superalloy powder, and on the outer side thereof a third compression molding layer 19c is formed using thermoplastic Ni-base superalloy powder, thereby forming a compression molding layer 19, i.e., outer cylinder.

In addition, to obtain the compression molding layers 19a, 19b, and 19c shown in FIGS. 11 and 12, it is not absolutely necessary to compression mold them separately; for example, such powder filler layers may be formed by making use of centrifugal force due to rotation and then they may be compacted molded at the same time.

In addition, in the case of making the aforesaid compression molding layer 19 in multilayer construction having two or more layers, the first compression molding layer 19a of copper powder and the other compression molding layers 19b and 19c can be compacted to the theoretical density by the application of hot isostatic pressing, i.e., HIP, subsequent to sintering. Further, in forming the outer cylinder of such multilayer construction, Woods metal serving as the filler in the grooves forming the cooling section of channel construction around the periphery of the inner cylinder 11 may be replaced by a filter which has sufficient heat resistance under high temperature during HIP and which can be easily removed from the grooves after HIP, for example, such ceramic powder as alumina or such inorganic compound as calcium phosphate, in which case it is to be pointed out that the compaction of the individual compression molding layers can be attained by performing HIP alone while omitting preliminary sintering.

In addition, in the embodiment forming the compression molding layer 19 of three-layer construction shown in FIG. 12, the Ni-base superalloy powder used to form the second compression molding layer 19b is, preferably, a spherical Ni-base superalloy powder formed by common gas atomization or vacuum atomization. Examples are Rene 95, IN 100, Ast roloy, and Merl 76. As for the thermoplastic superalloy powder used to form the third compression molding layer 19c, a powder is preferably which can be easily compacted to the theoretical density at lower temperature and pressure than the conventional HIP treatment temperature and pressure by imparting a prestrain by a roll mill, attritor, or ball mill. Thereby, HIP treatment can be applied at a temperature of about 950° C. which is lower than the usual HIP treatment temperature for superalloy and hence the first compression molding layer 19a and the second compression molding layer 19b made of Ni-base superalloy powder can be densified at the same time. In this connection, it is to be pointed out that since singly filling spherical superalloy powder is not sufficient for HIP formation, it is necessary to use thermoplastic alloy powder so as to adjust the CIP and HIP treatment temperatures.

In the production method wherein the compression molding layer is formed so that it comprises two or more compression molding layers as in the embodiments shown in FIGS. 11 and 12, in order to eliminate the permeability of the base copper layer, i.e., the first compression molding layer prior to the step of compression molding the outer cylinder, it is preferably to form a Cu plating shell on the periphery of the inner cylinder after Woods metal has been filled into the grooves formed on the outer periphery of the inner cylinder. Further, the same effect can be attained even when a thinner plating layer is formed by using Ag or Sn instead of Cu.

Although the present invention has been described and illustrated in detail, it is clearly understood that the same is by way of illustration and example only and is not to be taken by way of limitation, the spirit and scope of the present invention being limited only the terms of the appended claims.

What is claimed is:

1. A method of producing rocket combustors comprising the step of:
   preparing a cylinder provided on its outer periphery with a cooling wall of channel construction having a plurality of grooves;
   filling the grooves of said cylinder with a filler;
   compression molding a metal powder to a predetermined thickness around the periphery of the cylinder filled with the filler;
   sintering said compression molded body after said compression molding step; and
   forming an Ni electroforming layer on the outer side subsequent to said sintering step.

2. A method of producing rocket combustors as set forth in claim 1, wherein said step of filling the groove of the cylinder with the filler is followed by the step of forming a Cu plating layer on the outer periphery of the cylinder filled with the filler.

3. A method of producing rocket combustors as set forth in claim 1, wherein said step of filling the grooves of the cylinder is followed by the step of forming an Ag or Sn plating layer on the outer periphery of the cylinder filled with the filler.

4. A method of producing rocket combustors as set forth in claim 1, wherein low-melting alloy is used as said filler.

5. A method of producing rocket combustors as set forth in claim 4, wherein a low-melting alloy having a melting point of about 50°–200° C. is used as said low-melting alloy.

6. A method of producing rocket combustors as set forth in claim 1, wherein a filler which is composed of ceramic powder or an inorganic compound and which withstands the temperature required for hot isostatic pressing is used as said filler.

7. A method of producing rocket combustors comprising the steps of:
   preparing a cylinder provided on its outer periphery with a cooling wall of channel construction having a plurality of grooves;
   filling the grooves of said cylinder with a filler;
   compression molding around the periphery of the cylinder filled with the filler a base layer composed of Cu powder or Cu powder mixed with Ag or Sn and a second layer composed of a mixture of Cu powder and Ni-base superalloy powder;
   applying a sintering treatment after said compression molding; and
   applying a hot isostatic pressing treatment subsequent to said sintering step.

8. A method of producing rocket combustors as set forth in claim 7, wherein said compression molding step is such that first the base layer is compression molded and then the second layer is subsequently compression molded.

9. A method of producing rocket combustors as set forth in claim 7, wherein said compression molding step is such that different metal powders to form the base layer and second layer are filled into a mold, whereupon they are compression molded simultaneously.

10. A method of producing rocket combustors as set forth in claim 7, wherein in said compression molding step, a third layer of thermoplastic Ni-base superalloy powder is formed on the outer side of the second layer.

11. A method of producing rocket combustors as set forth in claim 10, wherein said third layer is separately formed after the base layer and second layer have been compression molded.

12. A method of producing rocket combustors as set forth in claim 10, wherein said base layer and second layer are simultaneously compression molded.

13. A method of producing rocket combustors as set forth in claim 7, wherein said step of filling the grooves on the cylinder with the filler is followed by the step of forming Cu plating shell on the outer periphery of the cylinder filled with the filler.

14. A method of producing rocket combustors as set forth in claim 7, wherein said step of filling the grooves of the cylinder with the filler is followed by the step of forming an Ag or Sn plating layer on the outer periphery of the cylinder filled with the filler.

15. A method of producing rocket combustors as set forth in claim 7, wherein a low-melting alloy is used as said filler.

16. A method of producing rocket combustors as set forth in claim 7, wherein a low-melting alloy having a melting point of about 50°–200° C. is used as said low-melting alloy.

17. A method of producing rocket combustors as set forth in claim 7, wherein a filler which is composed of ceramic powder or an inorganic compound and which withstands the temperature required for hot isostatic pressing is used as said layer.

* * * * *

UNITED STATES PATENT AND TRADEMARK OFFICE
CERTIFICATE OF CORRECTION

PATENT NO. : 4,582,678
DATED : April 15, 1986
INVENTOR(S) : Masayuki NIINO et al It is certified that error appears in the above-identified patent and that said Letters Patent is hereby corrected as shown below:

Title page, Item [73] should read as follows:

[73] Assignees: National Aerospace Laboratories of Science & Technology Agency; Yoshimichi Masuda; Ryuzo Watanabe; Junjiro Takekawa; Sumitomo Electric Industries, Ltd., all of Japan Signed and Sealed this Fourth Day of November, 1986

[SEAL]

Attest:

DONALD J. QUIGG

Attesting Officer

Commissioner of Patents and Trademarks